United States Patent [19]

Ramanathan

[11] 3,966,706

[45] June 29, 1976

[54] 2,6-DIHYDROXY-3-CYANO-4-METHYLPYRIDINE CONTAINING AZO DYES WHICH CONTAIN A FUNCTIONAL AMINO GROUP

[75] Inventor: Visvanathan Ramanathan, Basel, Switzerland

[73] Assignee: Ciba-Geigy AG, Basel, Switzerland

[22] Filed: Sept. 7, 1973

[21] Appl. No.: 395,304

Related U.S. Application Data

[63] Continuation of Ser. No. 110,240, Jan. 27, 1971, which is a continuation of Ser. No. 827,960, May 26, 1969, abandoned.

[52] U.S. Cl. ............................. 260/156; 260/153; 260/154; 260/155
[51] Int. Cl.² ......................................... C07B 29/36
[58] Field of Search ............ 260/154, 155, 156, 153

[56] References Cited
UNITED STATES PATENTS

| | | | |
|---|---|---|---|
| 2,893,816 | 7/1959 | Tsang et al. | 260/155 |
| 3,133,052 | 5/1964 | Merian et al. | 260/158 |
| 3,139,421 | 6/1964 | Elslager et al. | 260/154 |
| 3,341,514 | 9/1947 | Entschel et al. | 260/205 X |
| 3,487,066 | 12/1969 | Ritter et al. | 260/156 |
| 3,542,758 | 11/1970 | Hegar | 260/156 |
| 3,627,751 | 12/1971 | Hegar et al. | 260/206 X |
| 3,640,674 | 2/1972 | Berrie et al. | 260/156 |
| 3,661,886 | 5/1972 | Hegar | 260/206 X |
| 3,664,996 | 5/1972 | Berrie et al. | 260/156 |
| 3,725,383 | 4/1973 | Austin et al. | 260/156 |

FOREIGN PATENTS OR APPLICATIONS

| | | | |
|---|---|---|---|
| 1,901,712 | 9/1969 | Germany | 260/156 |
| 2,002,022 | 7/1971 | Germany | 260/156 |
| 1,927,213 | 12/1969 | Germany | 260/156 |
| 6,918,341 | 6/1970 | Netherlands | 260/156 |

*Primary Examiner*—Henry R. Jiles
*Assistant Examiner*—R. W. Ramsuer
*Attorney, Agent, or Firm*—Joseph G. Kolodny; Edward McC. Roberts; Prabodh I. Almaula

[57] ABSTRACT

Basic azo dyestuffs of the general formula

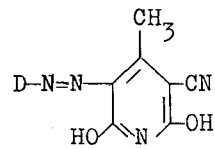

wherein D denotes the residue of a diazo component which may contan an azo group and which contains at least one amino, hydrazino or etherified hydroxylamino group that may be quaternated are valuable dyestuffs for dyeing and printing synthetic fibres distinguished by a good fastness to light and a very good fastness to sublimation.

19 Claims, No Drawings

2,6-DIHYDROXY-3-CYANO-4-METHYLPYRIDINE CONTAINING AZO DYES WHICH CONTAIN A FUNCTIONAL AMINO GROUP

This is a continuation of application Ser. No. 110,240, filed on Jan. 27, 1971, which in turn is a continuation of application Ser. No. 827,960 filed May 26, 1969, now abandoned.

The present invention provides new valuable azo dyestuffs, preferably free from sulphonic acid groups, of the general formula

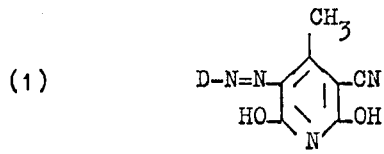

(or the tautomeric dyestuffs containing a pyridone residue instead of the hydroxypyridine residue), wherein D denotes the residue of a diazo component which may contain azo groups and which contains at least one amino, hydrazino or etherified hydroxylamino group that may be quaternised. The term amino groups comprises groups which contain a basic nitrogen atom, that is to say a nitrogen atom capable of protonisation or salt formation. In particular, the invention provides azo dyestuffs of the formula

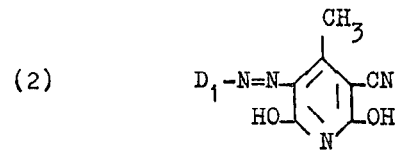

wherein $D_1$ denotes the residue of an aromatic diazo component of the benzene or naphthalene series or of an at most bicyclic heterocyclic diazo component, which contains an amino, hydrazino or etherified hydroxylamino group that may be quaternised which is bound via a low molecular carbon bridge which may be interrupted by hetero-atoms or forms part of a ring.

Of particular interest are dyestuffs of the formula

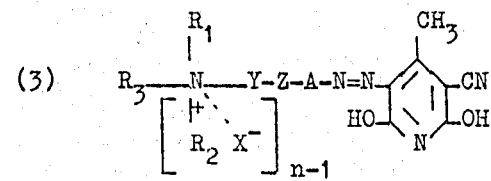

wherein A denotes a benzene residue, Z denotes a direct bond or a bridge member for example —O-, -S-, -NR'-, -CO-, NR'CO-or -NR'SO$_2$—, wherein R' denotes hydrogen or a low molecular alkyl residue, Y denotes a carbon bridge which contains at most 6 carbon atoms and may be interrupted by hetero-atoms or is part of a ring formed by Y, N and $R_1$ and/or $R_3$, $R_1$ and $R_2$ each denotes hydrogen or an alkyl, aralkyl or cycloalkyl residue, and $R_3$ denotes hydrogen or an alkyl, aralkyl, cycloalkyl or alkoxy residue or an amino group, and wherein N together with $R_1$ and/or $R_2$ and/or $R_3$ or N together with Y and $R_1$ and/or $R_3$ can form part of a heterocyclic ring, X denotes an anion and $n = 1$ or 2.

According to the invention the new dyestuffs may be manufactured by amidation or condensation, coupling or quaternisation. The manufacture by amidation or condensation may be carried out by reacting an azo compound of formulae (1), (2) or (3) which instead of the amino, hydrazino or hydrozylamino group possess a reactive atom or a reactive group, for example a halogen atom or a sulphato group or an arylsulphonyloxy or alkylsulphonyloxy group, preferably bound via a carbon bridge, for example Y, with an amine, hydrazine or an etherified hydroxylamine.

The manufacture by coupling may be carried out by coupling a diazotised amine of formulae D—NH$_2$, or D$_1$—NH$_2$ with 2,6-dihydroxy-3-cyano-4-methylpyridine.

In the manufacture by quaternisation dyestuffs of formulae (1) to (3) which contain a non-quaternised amino, hydrazino or etherified hydroxylamino group, can be treated with quaternising agents, that is to say for example dyestuffs of formula (3), wherein $n = 1$, and A, Y and Z, $R_1$ and $R_3$ have the significance indicated, may be reacted with compounds of formula R$_2$X, wherein X has the significance indicated and R$_2$ represents an alkyl, aralkyl or cycloalkyl residue.

The azo dyestuffs used in the manufacture by amidation or condensation are advantageously obtained cy coupling diazotised amines, preferably of the aromatic or heterocyclic series, with 2,6-dihydroxy-3-cyano-4-methylpyridine. A recital of suitable diazo components is given below when explaining the manufacture by coupling, but instead of the amino, hydrazino or etherified hydroxylamino groups which are preferably terminally bound to an alkylene bridge, a replaceable atom or group, for example a halogen atom or an ester grouping which is preferably derived from a strong inorganic oxygen-containing acid or from an aliphatic or aromatic sulphonic acid, for example a sulphato group or an arylsulphonyloxy or alkylsulphonyloxy group, must be present. The dyestuffs manufactured from these components by coupling are according to the invention reacted with amines, hydrazines or etherified hydroxylamines. Suitable compounds for this reaction are particularly those which possess hydrogen atoms, aliphatic residues which may contain ether bridges or hydroxyl groups and possessing at most 4 carbon atoms, or cyclohexyl, benzyl or phenyl residues on the nitrogen atom or on the nitrogen atoms, or in which the nitrogen atom is a ring atom of a 5-or 6-membered saturated or unsaturated ring, which may contain a nitrogen, oxygen or sulphur atom as a further heteroatom and which may have a condensed-on aromatic ring. As such compounds, the following may for example be mentioned:

Amines:

ammonia and primary and secondary amines for example, methylamine, ethylamine, isopropylamine, methoxyethylamine, methoxypropylamine, dimethylamine, diethylamine, methylphenyl amine, ethylphenylamine, chlorethylamine, ethanolamine, diethanolamine, propanolamine, benzylamine or cyclohexylamine, N-methylcyclohexylamine, morpholine, pyrrolidine, piperidine or piperazine, tertiary amines for example trimethylamine, triethylamine, triethanolamine, dimethylbenzylamine, diethylmethylamine, pyridine, picoline, lutidine, N,N-dimethylcyclohexylamine, N- methyl-piperidine, N-methyl-piperazine, N-methylmorpholine, quinoline, pyrimidine or 1,4-diazabicyclo(2,2,2)-octane.

Hydrazines:

N-methylhydrazine, N,N-dimethylhydrazine, N,N'-diethylhydrazine, N,N,N'-trimethylhydrazine, N,N,N,N'-tetramethylhydrazine, N-aminopiperidine, N-aminopyrrolidine or 1,5-diazabicyclo-(0,3,3)-octane.

Etherified Hydroxylamines:

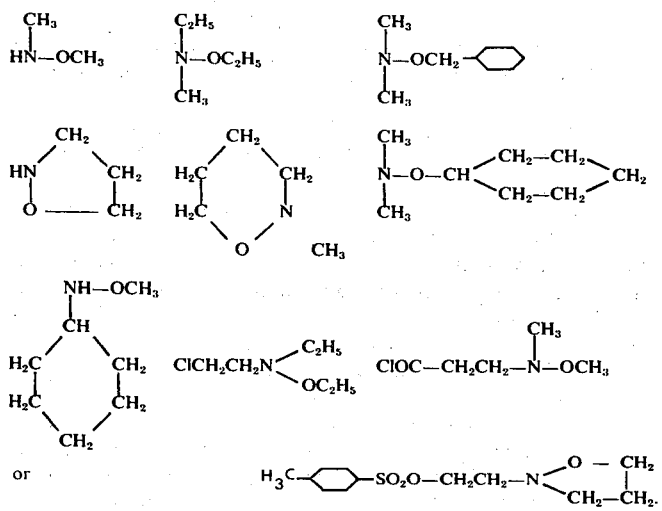

or

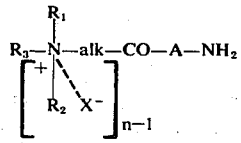

Compounds in which the carbon bridge present in the residue of the diazo component possesses a heteroatom, especially an oxygen, sulphur or nitrogen atom, can also be manufactured by effecting the condensation at the hetero-atom, that is to say by reaction of an amine, hydrazine or hydroxylamine which possesses a reactive atom or group bound via an alkylene bridge, for example an aminoethyl group, with the corresponding dyestuff, which also possesses a reactive atom or group bound via an alkylene bridge in the residue of the diazo component, for example a chlorine atom or a methanesulphonyloxy group.

The reaction of the dyestuff which for example contains a halogen or sulphatoalkyl group, with the amine, hydrazine or etherified hydroxylamine can take place in a neutral solvent, for example in chlorobenzene, alcohols or aqueous alcohol mixtures or in dimethylformamide, or also without solvents, advantageously at elevated temperature in an excess of the amine, hydrazine or hydroxylamine and if desired with the addition of catalysts, for example NaI.

In the manufacture by coupling according to the invention, a diazotised amine may be coupled with 2,6-dihydroxy-3-cyano-4-methylpyridine, the diazo component already containing the amino, hydrazino or etherified hydroxylamino group, preferably a primary group or if desired a low molecular substituted amine group, that is to say substituted by an aliphatic residue containing at most 4 carbon atoms, or a 5- or 6-membered cyclic group, especially such an amino group which is however preferably quaternised and is bound via an aliphatic carbon bridge which may be branched, contains at most 6 carbon atoms and if desired contains hetero-atoms for example oxygen, sulphur or nitrogen.

As examples of diazo components aromatic compounds may be particularly mentioned, for example those of the naphthalene series and especially of the benzene series, which as substituents especially contain halogen atoms or nitro, sulphonamide, phenyl, phenoxy or phenylazo groups or low molecular alkyl, halogenalkyl, alkoxy, alkylsulphonyl, N-alkylated sulphonamide or carboxylic acid alkyl ester groups; in this connection "low molecular alkyl" means a radical containing at most 4 aliphatically bound carbon atoms. Such diazo components preferably correspond to the formula $$\left[ \begin{array}{c} R_1 \\ | \\ R_3-\overset{+}{N}-alk-CO-A-NH_2 \\ | \setminus \\ R_2 \ \ X^- \end{array} \right]_{n-1}$$

wherein X, n, $R_1$, $R_2$ and $R_3$ have the significance indicated for formula (3), alk denotes an alkylene bridge, A represents a benzene nucleus which may carry substituents, for example halogen atoms, nitro groups lower alkyl groups or alkoxy groups. As examples of non-quaternised derivatives the following for example may be mentioned: 4-amino-α-amino-acetophenone, 4-amino-3-methyl-, -methoxy- or -chlor-α-amino-acetophenone, 4-amino-2,5-dimethyl-β-aminopropiophenone, as well as the corresponding compounds which are monoalkylated or dialkylated or aralkylated in the aminoacetyl residue for example 4-amino-α-N-methylaminoacetophenone, 4-amino-α-N-benzylaminoacetophenone, 4-amino-α-N-cyclohexylaminoacetophenone or 4-amino-3-methyl-β-N,N-diethylaminopropiophenone, and also for example 4-amino-α-N-methoxyaminoacetophenone, 4-amino-3-chlor-α-N-ethyl-N-ethoxyaminoacetophenone, 4-amino-2-chlor-α-hydrazinoacetophenone, 4-amino-2-chlor-α-N-methylhydrazinoacetophenone or 3-amino-β-N-ethylhydrazinopropiophenone.

As examples of quaternised derivatives, the following compounds may be mentioned: 4-amino-α-(N-chloro-N,N,N-trimethylor N,N-dimethyl-N-methoxyamino)-acetophenone, 4-amino-α-(N-chloro-N,N,N-triethyl- or N,N-diethyl-N-ethoxyamino)-acetophenone, 4-amino-α-(N-chloro-N-methyl- or N-methoxypiperidino)acetophenone, 4-amino-3-methyl-α-(N-chloro-N,N,N-triethyl- or N,N-diethyl-N-methoxyamino)-acetophenone, 4-amino-3-methoxy-α-(N-chloro-N,N,N-triethanol- or N,N-diethanol-N-ethoxyamino)-acetophenone, 4-amino-3-chlor-α-(N-chloro-N,N-dimethylhydrazino)acetophenone, 4-amino-3-brom-α-(N-chloro-N,N-diethylhydrazino)acetophenone, 4-amino-2-chlor-α-(N-chloro-N,N,N'-trimethylhydrazino)-acetophenone, 4-amino-2,5-dimethyl-α-(N-chloro-N-aminipiperidino)-acetophenone, 4-ammino-β-(N-chloro-N-methoxypiperidino)-propiophenone, 3-amino-α-(N-chloro-N,N-dimethyl-N-methoxyamino)-acetophenone or 4-amino-α-(N-bromo-N-ethyl-N-benzyl-N-methoxyamino)-acetophenone.

These diazo components can be obtained according to known methods, for example by reaction of acetylaminobenzene with chloracetyl chloride or chloropropionyl chloride, reaction of the chloracylacetylaminobenzenes thus obtained with an amine, hydrazine or etherified hydroxylamine and removal of the acetyl group. In the reaction with tertiary amines or hydrazines or with N,N-disubstituted etherified hydroxylamino compounds quaternised residues are thereby produced.

Further suitable diazo components which possess an amino, hydrazino or etherified hydroxylamino group are also those of the general formula

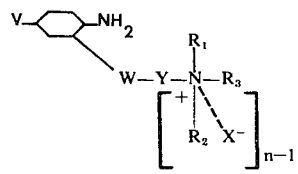

wherein V denotes a nitro, alkylsulphonyl or optionally substituted sulphonamide group, W denotes a bivalent residue, for example a —O— or —S—bridge or a direct bond, and $R_1$, $R_2$, $R_3$, X, Y and $n$ have the significance indicated for formula (3), and wherein the benzene residue may contain further substitutents.

As such diazo components, the compounds of the following formulae may for example be mentioned:

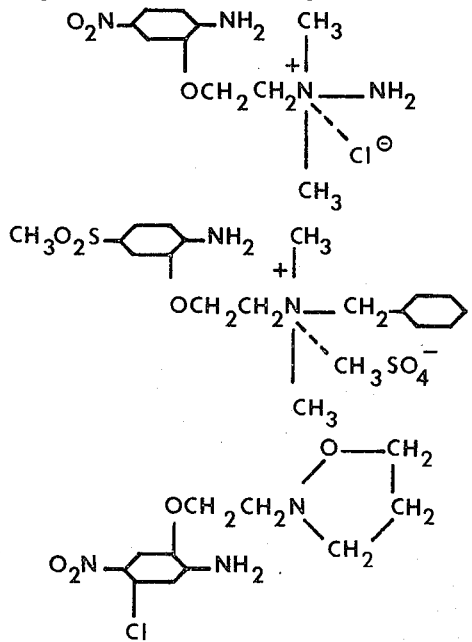

or

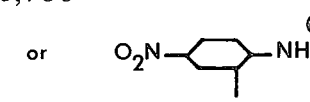

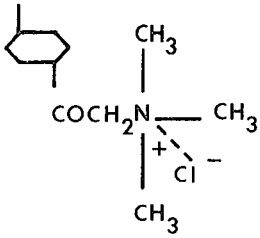

Further suitable diazo components which contain an amino, hydrazino or etherified hydroxylamino group are also those of the general formula

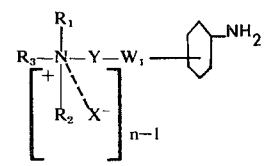

in which $W_1$ denotes a direct bond or bivalent organic residue, for example a —$SO_2$—, —$SO_2NR_4$—, —$CONR_4$— or —COO— bridge, and $R_1$, $R_2$, $R_3$, X, Y and $n$ have the significance indicated for formula (3), and $R_4$ denotes hydrogen or a low molecular alkyl residue. As such diazo components there may for example be mentioned p-aminobenzyldimethylamine, p-aminobenzyl-N-methylhydrazine, and also the compounds of the formulae

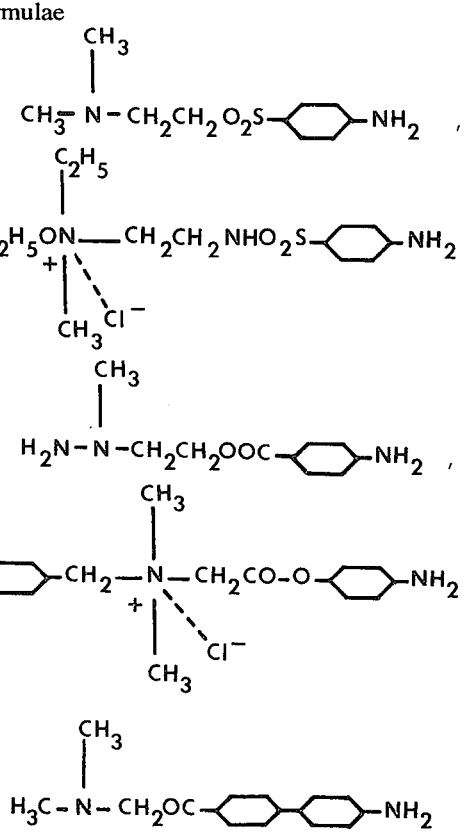

Further aromatic diazo components to be mentioned are for example those of the formulae:

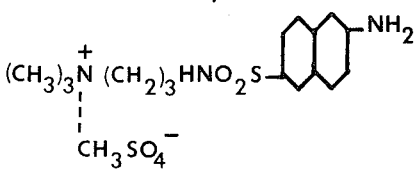

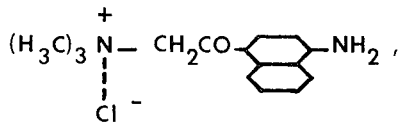

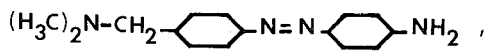

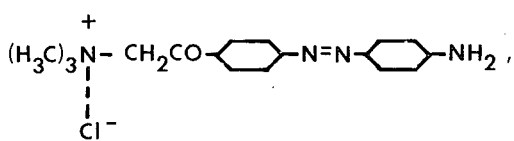

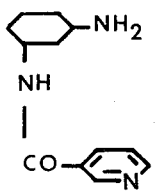

or 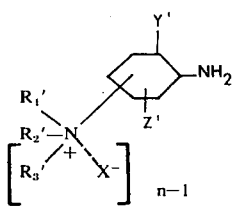

As aromatic diazo components there may finally be mentioned those of the formula

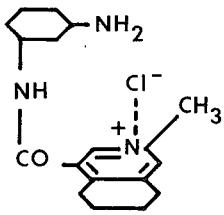

wherein $R_1'$, $R_2'$ and $R_3'$ each denotes a lower alkyl group which may be substituted by a hydroxyl, cyano or carbamyl group, Y' and Z' each denotes a hydrogen or halogen atom or an alkyl, alkoxy, trifluoromethyl, nitro, alkylsulphone, arylsulphone, aryl, aryloxy, acylamino, acyl, cyano, or carboxylic acid ester group, or a carboxylic acid amide or sulphonic acid amide group which may be substituted by a lower alkyl residue or by an aryl residue, X denotes an anion and $n$ denotes 1 or 2.

Suitable heterocyclic diazo components are particularly those of the general formula

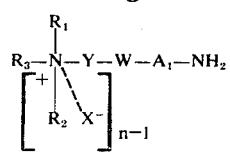

wherein $R_1$, $R_2$, $R_3$, X, Y, W and $n$ have the significance indicated and $A_1$ denotes heterocyclic 5- or 6-membered ring having 1 to 3 hetero-atoms which may also carry a condensed aromatic ring, preferably a heterocyclic 5-membered ring having 2 or 3 hetero-atoms, of which at least one is a nitrogen atom.

The heterocyclic diazo components can also contain the substituents mentioned for the aromatic diazo components. The heterocyclic components can for example belong to the pyridine, pyrazole, imidazole, triazole, tetrazole, oxazole, thiazole, selenazole, oxidazole, thiadiazole, pyrimidine, triazine, quinoline, indazole, benzimidazole, naphthimidazole, benzoxazole, naphthoxazole, benzthiazole, naphthothiazole or benzoselenazole series. The following may be mentioned as examples: 2-aminobenzthiazole-6-(N-chloro-N,N,N-trimethylaminopropyl)-sulphonamide, 2-aminobenzthiazole-6-carboxylic acid dimethylaminoethyl ester, 2aminobenzthiazole-6-carboxylic acid-N-bromo-N,N,N-triethylaminoethylamide, 2-amino-6-diethylaminoethylthiobenzthiazole, 2-amino-6-diethylaminoethoxybenzthiazole, 2-amino-6-N-methosulphate-N,N,N-trimethylaminomethylbenzthiazole, 2-amino-5-morpholinomethylthiazole, 2-amino-5-piperidinomethylthiazole, 2-amino-4-(4'-dimethylaminomethyl)-phenylthiazole, 5-amino-3-(4'-N-chloro-N,N,N-trimethylaminomethyl)-phenyl-1,2,4-thiadiazole, 2-amino-5-(N-bromo-N,N,N-trimethylamino)-methyl-1,3,4-thiadiazole, 2-amino-5-(4'-N-chloro-N,N,N-trimethylaminomethyl)-phenyl-1,3,4-thiadiazole, 3-aminopyridine, 3-amino-1-(4'-dimethylaminomethyl)phenylpyrazole, 3amino-6-(dimethylamino)-methylindazole, 3-amino-1,2,4-triazole, 3-aminopyrazole, 1-β-dimethylaminoethyl-3-methyl-5-aminopyrazole, and 1-γ-dimethylaminopropoxyethyl-3-methyl-5-aminopyrazole. Heterocyclic diazo components from the thiazole, thiadiazole or benzthiazole series are preferred.

Instead of a single diazo component a mixture of two or more of the diazo components may be used according to the invention.

The diazotisation of the diazo components mentioned can take place according to known methods, for example with an inorganic acid, especially hydrochloric acid, and sodium nitrite, or for example with a solution of nitrosylsulphuric acid in concentrated sulphuric acid.

The coupling can also be performed in known manner, for example in a neutral to acid medium, if desired in the presence of sodium acetate or similar buffer substances or catalysts which influence the rate of coupling, for example pyridine or its salts.

According to a further process of the invention, those of the new dyestuffs which contain a quaternised amino, hydrazino or etherified hydroxylamino group can also be obtained by quaternising the corresponding dyestuffs which contain a non-quaternised amino, hydrazino or etherified hydroxylamino group by treatment with alkylating agents. Such alkylating or quaternising agents may for example be: esters of strong inorganic acids or of organic sulphonic acids, for example dimethyl sulphate or diethyl sulphate, alkyl halides, for example methyl chloride, bromide or iodide, aralkyl halides, for example benzyl chloride, esters of low molecular alkane sulphonic acids for example methyl esters of methane sulphonic ethane sulphonic or butane sulphonic acid, and esters of benzene sulphonic acids which can contain additional substituents, for example the methyl, ethyl, propyl or butyl esters of benzene sulphonic acid, 2- or 4-methylbenzene sulphonic acid, 4-chlorobenzene sulphonic acid or 3- or 4-nitrobenzene sulphonic acid.

The alkylation advantageously takes place by heating in an inert organic solvent, for example hydrocarbons for example benzene, toluene or xylene, halogenated hydrocarbons for example carbon tetrachloride, tetrachlorethane, chlorobenzene or o-dichlorobenzene, nitro-hydrocarbons for example nitromethane, nitrobenzene or nitronaphthalene. Acid anhydrides, acid amides and nitriles, for example acetic anhydride, dimethylformamide or acetonitrile or also dimethylsulphoxide can also be used as solvents for the alkylation. Instead of a solvent a large excess of alkylating agent may also be used. In this case it is admittedly necessary to take care that the mixture does not overheat, since the reaction is strongly exothermic. Nevertheless it is necessary in most cases, especially in the presence of organic solvents, to heat the reaction mixture externally in order to start the reaction. In special cases the alkylation can also be effected in an aqueous medium or by using an alcohol, if desired in the presence of small quantitites of potassium iodide.

Where purification is necessary, the dyestuff salts can be advantageously purified by dissolving in water, whereupon any unreacted starting dyestuff can be filtered as an insoluble residue. The dyestuff can again be separated from the aqueous solution by adding water-soluble salts, for example sodium chloride.

The quaternised dyestuffs obtained in accordance with the process preferably contain as the anion, the residue of a strong inorganic acid, for example hydrochloric acid, sulphuric acid or phosphoric acid, or the residue of a sulphuric acid semi-ester, the residue of a sulphonic acid or the residue of a carboxylic acid. The anions mentioned, which are introduced into the dyestuff molecule in accordance with the process, can also be replaced by anions of other inorganic acids, for example phosphoric acid or sulphuric acid, or of organic acids for example formic acids, lactic acid or tartaric acid; in certain cases the free bases can also be used. The dyestuff salts can also be used in the form of double salts, for example with halides of the elements of the second group of the Periodic System, especially zinc chloride or cadmium chloride.

The dyestuffs or dyestuff salts obtained in accordance with the invention which contain an amino, hydrazino or etherified hydroxylamino group which may be quaternised, are suitable for dyeing and printing a wide variety of fully synthetic fibres, for example polyvinyl chloride, polyamide or polyurethane fibres, and also fibres of polyesters of aromatic dicarboxylic acids, for example polyethylene terephthalate fibres, but especially polyacrylonitrile fibres or polyvinylidene cyanide fibres (Darvan), as well as anionically modified fully synthetic polyamide and polyester fibres. By polyacrylonitrile fibres are particularly to be understood polymers which contain more than 80%, for example 80 to 95%, of acrylonitrile; they may also contain 5 to 20% of vinyl acetate, vinylpyridine, vinyl chloride, vinylidene chloride, acrylic acid, acrylic acid esters, methacrylic acid, methacrylic acid esters and the like. These products are for example sold under the following trade names: "Acrilan 1656" (The Chemstrand Corporation, Decatur, Ala., U.S.A.), "Acrilan 41" (The Chemstrand Corporation), "Creslan" (American Cyanamid Company), "Orlon 44" (DuPont), "Crylor HH" (Soc. Rhodiacéta SA. France), "Leacril N" (Applicazioni Chimice Societa per Azioni, Italien), "Dynel" (Union Carbide Chem. Corp.), "Exlan" (Japan Exlan Industry Co. Japan), "Vonnel" (Mitsubishi, Japan), "Verel" (Tennessee Eastman, U.S.A.), "zefran" (Dow Chemical, U.S.A.), "Wolcrylon" (Filmfabrik Agfa, Wolfen), "Ssaniw" (U.S.S.R.) and also "Orlon 42", "Dralon", "Courtelle and the like.

On these fibres, which can also be dyed in admixture with one another, the new dyestuffs yield intense and level dyeings of good light fastness and good general fastness properties, especially good fastness to washing, perspiration, sublimation, creasing, decatising, ironing, rubbing, carbonisation, water, chlorine water, sea water, dry cleaning, overdyeing and solvents. The new dyestuffs according to the invention also possess inter alia a good stability over a wider pH range, good affinity and a good building up capacity, for example in aqueous solutions of various pH values, and good fastness to bucking. Furthermore the new dyestuffs generally reserve well on wool and other natural polyamide fibres, as well as on cotton.

The quaternised water-soluble dyestuffs generally have a low sensitivity to electrolytes and in part have a pronouncedly good solubility in water or polar solvents. The dyeing with the quaternised water-soluble dyestuffs is generally carried out in an aqueous, neutral or acid medium, at the boiling point under atmospheric pressure, or in a closed vessel at an elevated temperature and elevated pressure. The commercially available levelling agents do not interfere with the process but are not necessary.

The dyestuffs indicated are particularly suitable for trichrome dyeing. Because of their resistance to hydrolysis they can also be advantageously used for high temperature dyeing and for dyeing in the presence of wool. They can also be applied to the fibre materials by printing. For this purpose a printing paste is for example used which contains a dyestuff together with the usual printing adjuvants. They are furthermore also suitable for the bulk dyeing of polymerisation products of acrylonitrile and also of other plastic compositions which may be dissolved, to give shades fast to light and washing, and for dyeing oil paints or lacquers. Finally they may also be used for dyeing mordanted cotton. Because of their good levelling properties they are particularly suitable for carpet dyeing.

The new dyestuffs manufactured according to the invention, which are water-insoluble or sparingly water-soluble and which possess a non-quaternised amino, hydrazino or etherified hydroxylamino group, are advantageously used in a finely divided form and with the addition of dispersing agents for example soap, sulphite cellulose waste lye or synthetic detergents, or a combination of various wetting agents and dispersing agents. As a rule it is advantageous to convert these dyestuffs, before dyeing, into a dyeing preparation which contains a dispersing agent and the finely divided dyestuff in such a form that on dilution of the dyestuff preparations with water a fine dispersion is produced. Such dyestuff preparations can be obtained in a known manner, for example by grinding the dyestuff in high efficiency grinding devices in a dry or wet form with or without the addition of dispersing agents during the grinding process. They are also suitable for dyeing and printing a wide variety of semi-synthetic and fully synthetic fibres, for example cellulose acetate, polyolefines, for example modified polypropylene, polyester, polyvinyl chloride, polyamide or polyurethane fibres, but especially polyacrylonitrile fibres.

In order to obtain more intense dyeings it is advantageous to carry out the dyeing process at higher temperatures, for example at the boiling point.

It is advantageous to add a dispersing agent and to render the dyebath weakly acid, for example by adding a weak acid, for example acetic acid.

The new dyestuffs possessing a non-quaternised amino, hydrazino or etherified hydroxylamino group are also suitable for dyeing from organic solvents, for example for the continuous dyeing of polyacrylonitrile or polyester fibres from chlorinated aliphatic hydrocarbons which may contain dimethylformamide, for example 10%.

The present dyestuffs can also be applied by printing. For this purpose a printing ink is for example used which contains the finely dispersed dyestuff which may be mixed with other dyestuffs, together with the usual printing adjuvants, for example wetting agents and thickeners.

In the Examples which follow the parts, unless otherwise indicated, denote parts by weight and the percentages denote percentages by weight.

EXAMPLE 1

4.57 Parts of (p-aminophenacetyl)-trimethylammonium chloride (4-amino-α-(N-chloro-N,N,N-trimethylacetophenone) are dissolved in 20 parts of water and 7 parts by volume of concentrated hydrochloric acid are added. The solution is diazotised at 0 to 5°C by adding 5 parts by volume of 4N sodium nitrite solution. The diazo solution is added at 0 to 5°C to a solution of 3 parts of 2,6-dihydroxy-3-cyano-4-methylpyridine in 35 parts of water. After completion of the coupling the dyestuff is precipitated by adding salt. The dyestuff is filtered, redissolved in hot water, and salted out from the filtrate after filtering the solution. The precipitated dyestuff of formula

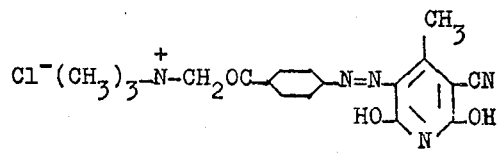

is filtered and dried. It dyes polyacrylonitrile fibres yellow shades having excellent fastness properties.

EXAMPLE 2

3 Parts of p-aminobenzyldimethylamine dissolved in 10 parts by volume of concentrated hydrochloric acid and 30 parts of water are diazotised at 0 to 5°C by adding 5 parts by volume of 4N sodium nitrite solution. The diazo solution is added at 0 to 5°C to a solution of 3 parts of 2,6-dihydroxy-3-cyano-4-methylpyridine in 35 parts of water. After completion of the coupling the coupling mixture is neutralised by means of sodium hydroxide solution. In case the dyestuff is somewhat water-soluble, salt is added until it precipitates completely. The precipitated dyestuff is filtered, washed with a salt solution and dried. It corresponds to formula

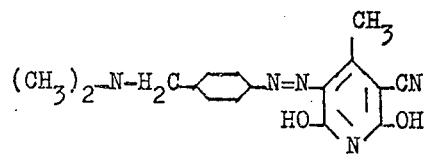

and dyes polyacrylonitrile fibres yellow shades having very good fastness to light.

EXAMPLE 3

4.14 Parts of 6-dimethylaminomethyl-2-aminobenzthiazole are dissolved in 50 parts by volume of phosphoric acid. 1.5 Parts of sodium nitrite are introduced at −5°C and the solution is stirred for a further 3 hours. 1.5 Parts of urea are added. The diazo solution thus obtained is added to a solution of 3 parts of 2,6-dihydroxy-3-cyano-4-methylpyridine in 100 parts of water. After completion of the coupling the coupling mixture is neutralised by means of sodium hydroxide solution. The precipitated dyestuff is filtered and rinsed with a little cold water. It corresponds to formula

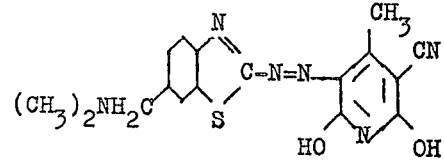

and dyes polyacrylonitrile fibres orange shades having very good fastness to light.

The same process yields dyestuffs which dye polyacrylonitrile fibres the shades indicated in column II of the Table below, when the diazo components indicated in column I are diazotised and coupled with 2,6-dihydroxy-3-cyano-4-methylpyridine.

| | I | II | |
| --- | --- | --- | --- |
| 1 |  | Cl⁻ | yellow |
| 2 | 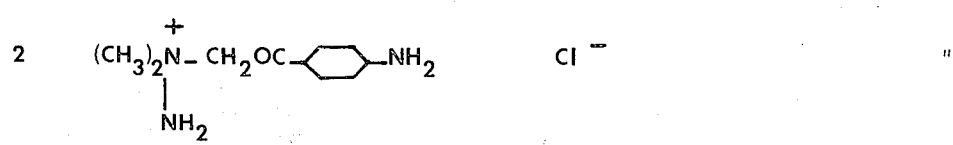 | Cl⁻ | " |

| | I | | II |
|---|---|---|---|
| 3 | (C$_2$H$_5$)$_2$N$^+$(OC$_2$H$_5$)—CH$_2$OC—C$_6$H$_4$—NH$_2$ | Br$^-$ | yellow |
| 4 | (CH$_3$)$_3$N$^+$—CH$_2$OC—C$_6$H$_4$—N=N—C$_6$H$_2$(OCH$_3$)(OCH$_3$)—NH$_2$ | Cl$^-$ | red |
| 5 | (C$_3$H$_7$)$_3$N$^+$—CH$_2$OC—C$_6$H$_4$—C$_6$H$_4$—NH$_2$ | Cl$^-$ | yellow |
| 6 | O$_2$N—C$_6$H$_3$(NH$_2$)—C$_6$H$_4$—COCH$_2$—N$^+$(piperidine-3-CH$_3$) | Cl$^-$ | " |
| 7 | O$_2$N—C$_6$H$_3$(NH$_2$)—O—C$_6$H$_4$—COCH$_2$—N$^+$(CH$_3$)$_3$ | Cl$^-$ | " |
| 8 | (2-methylpiperidinium)$^+$—CH$_2$OC—C$_6$H$_4$—NH$_2$ | Br$^-$ | " |
| 9 | (decahydroquinolinium)$^+$—CH$_2$OC—C$_6$H$_4$—NH$_2$ | Cl$^-$ | " |
| 10 | (C$_2$H$_5$)$_3$N$^+$—CH$_2$OC—C$_{10}$H$_6$—NH$_2$ | Cl$^-$ | orange |

-Continued

| | I | | II |
|---|---|---|---|
| 11 | (CH₃)₃N⁺(CH₂)₃HNOC—⟨⟩—NH₂ | Br⁻ | yellow |
| 12 | H₃C—⟨N⁺⟩—H₄C₂O—⟨⟩—NH₂ | C₇H₇SO₃⁻ | " |
| 13 | O₂N—⟨⟩—NH₂ with OC₂H₄—N⁺⟨⟩ substituent | CH₃SO₃⁻ | " |
| 14 | ⟨N⁺⟩—CH₂CH₂COOH₄C₂O—⟨⟩—NH₂ | Cl⁻ | " |
| 15 | CH₃O—⟨⟩—N⁺(CH₃)(CH₃)—H₄C₂O—⟨⟩—NH₂ | CH₃SO₃⁻ | " |
| 16 | O₂N—⟨⟩—NH₂ with OC₂H₄—N⁺(C₂H₅)₂ / NH₂ | C₆H₅SO₃⁻ | " |
| 17 | O₂N—⟨⟩—NH₂ with OC₂H₄—N⁺(CH₃)₂ / OCH₃ | C₇H₇SO₃⁻ | " |
| 18 | (CH₃)₂N⁺—H₄C₂O—⟨⟩—NH₂ with OCH₃ | C₇H₇SO₃⁻ | yellow |
| 19 | (C₄H₉)₂N⁺—H₄C₂O—⟨⟩—NH₂ with NH₂ | C₇H₇SO₃⁻ | " |
| 20 | (CH₃)₃N⁺—CH₂CH₂S—⟨⟩—NH₂ | C₆H₅SO₃⁻ | " |
| 21 | (CH₃)₃N⁺—CH₂COHNH₂C—C(H₃C)(NH₂)(CH₃)(CH₃) | Cl⁻ | " |

-Continued

| | I | | II |
|---|---|---|---|
| 22 | (CH₃)₃N⁺-N=HC-⟨C₆H₄⟩-NH₂ | CH₃SO₄⁻ | " |
| 23 | (CH₃)₂N⁺(CH₂)₃HNO₂S-⟨C₆H₄⟩-NH₂, with C₂H₅ on N | C₂H₅SO₄⁻ | " |
| 24 | piperidinium-N⁺-(CH₂)₂HNO₂S-⟨C₆H₃(Cl)⟩-NH₂ | Cl⁻ | " |
| 25 | (CH₃)₂N⁺(CH₂)₂HNO₂S-⟨C₆H₃(Cl)⟩-NH₂, with NH₂ on N | Cl⁻ | " |
| 26 | (C₂H₅)₃N⁺-CH₂CH₂O₂S-⟨C₆H₂(Cl)(Cl)⟩-NH₂ | Cl⁻ | yellow |
| 27 | decalin with NH₂ and SO₂NH-C₂H₄-N⁺(C₂H₅)₂-CH₂-C₆H₅ | Cl⁻ | orange |
| 28 | ⟨C₆H₁₀⟩-NH₂ with NHCOCH₂-N⁺(CH₃)(piperidinyl ring: CH₂-CH₂-CH₂-CH₂-CH₂) | Cl⁻ | yellow |
| 29 | ⟨C₆⟩-N=N-⟨C₆⟩-NH₂ with NHCOCH₂-N⁺-piperidine on each ring | 2 HSO₄⁻ | orange |
| 30 | CH₃-N⁺=N with N(CH=CH)-⟨C₆H₄⟩-NH₂ | CH₃SO₄⁻ | yellow |

| | I | II | |
|---|---|---|---|
| 31 | ![structure: 4-chloro-2-amino-phenyl with H3C-N+=CH-N(CH3)- group] | CH$_3$SO$_4^-$ | brown |
| 32 | ![structure: aminophenyl-CH2-N(piperidine-like ring with CH2-CH2 bridges)] | | yellow |
| 33 | ![structure: (CH2-CH2)2N-H2C-C6H4-N=N-C6H3(CH3)-NH2] | | orange |
| 34 | ![structure: morpholine-N-CH2OC-C6H3(Br)-NH2] | | yellow |
| 35 | ![structure: cyclohexyl-CH-N(CH3)-CH2OC-C6H4-NH2] | | " |
| 36 | (C$_4$H$_9$)$_2$N-H$_2$CH$_2$C-C$_6$H$_4$-NH$_2$ | | " |
| 37 | ![structure: piperidine-CH2H2C-C6H4-NH2] | | " |
| 38 | ![structure: C6H5-CH2-N(O-CH2-C6H5)-CH2OC-C6H4-NH2] | | " |
| 39 | H$_5$C$_2$N(OC$_2$H$_5$)-H$_2$C-C$_6$H$_4$-NH$_2$ | | yellow |
| 40 | ![structure: O2N-C6H3(NH2)-OC2H4-N(piperidine with CH2 bridge)] | | " |
| 41 | (CH$_3$)$_2$N(CH$_2$)$_3$HNO$_2$S-C$_6$H$_4$-NH$_2$ | | " |
| 42 | (C$_2$H$_5$)$_2$N(CH$_2$)$_2$HNOC-C$_6$H$_4$-NH$_2$ | | " |

3,966,706
-continued
| | I | II |
|---|---|---|
| 43 | 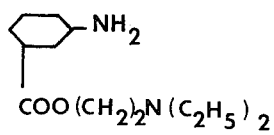 | " |
| 44 |  | " |
| 45 | 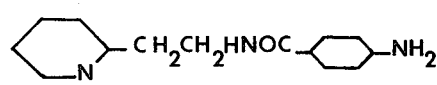 | " |
| 46 | 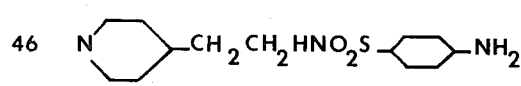 | " |
| 47 |  | " |
| 48 | 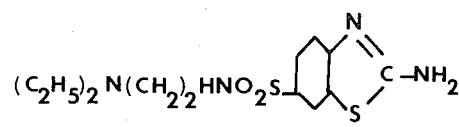 | orange |
| 49 | 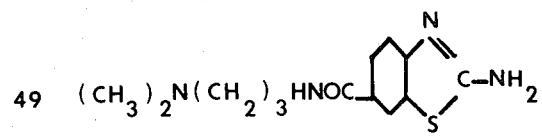 | orange |
| 50 | 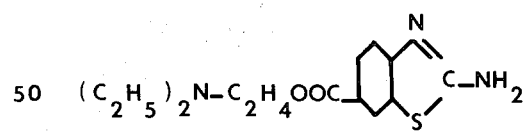 | " |
| 51 | 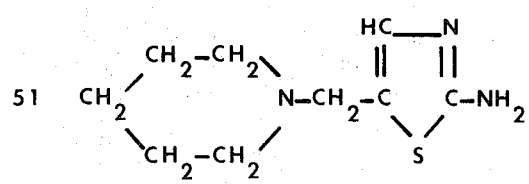 | yellowish red |
| 52 | 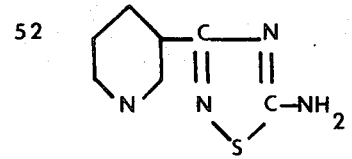 | yellow |

| | | |
|---|---|---|
| 53 | 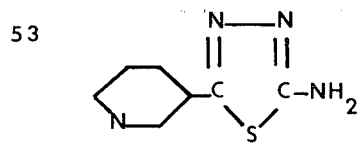 | " |
| 54 | 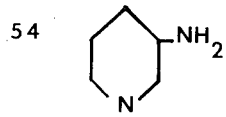 | " |
| 55 | 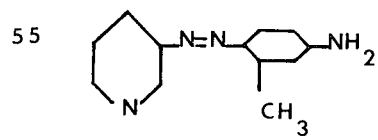 | orange |

EXAMPLE 4

6.39 Parts of 3-nicotinoylaminoaniline are triturated with 12 parts by volume of hydrochloric acid and the mixture is diluted with 120 parts of ice water. The solution is diazotised at 0° to 5°C by adding 7.5 parts by volume of 4N sodium nitrite solution. The diazo solution is added at 0 to 5°C to a solution of 4.5 parts of 2,6-dihydroxy-3-cyano- 4-methylpyridine in 100 parts of water. The coupling mixture is rendered neutral to Congo Red by adding sodium acetate solution. The precipitated dyestuff is filtered, washed with water and dried.

4 Parts of the dyestuff obtained as above are heated for 3 hours at 90° to 95°C with 40 parts of dimethyl sulphate. After cooling, the reaction mixture is poured into 200 parts of 10% sodium chloride solution. The dyestuff is precipitated by adding zinc chloride, filtered, redissolved in hot water and salted out from the filtrate after filtering the solution. The precipitated dyestuff of formula

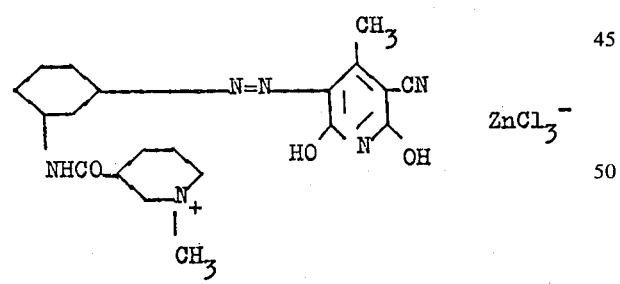

is filtered and dried. It dyes polyacrylonitrile fibres yellow shades having excellent fastness properties.

When diethyl sulphate, ethyl iodide, benzyl chloride, 2-chloroethanol, p-toluenesulphonic acid methyl ester or n-butyl bromide are used as the quaternising agent instead of dimethyl sulphate, dyestuffs having the same properties are obtained.

When the diazo components indicated below are diazotised instead of 3-nicotinoylaminoaniline, coupled with 2,6-dihydroxy-3-cyano-4-methylpyridine and quaternised with one of the specified quaternising agents, as described in Example 4, dyestuffs having similar properties are obtained.

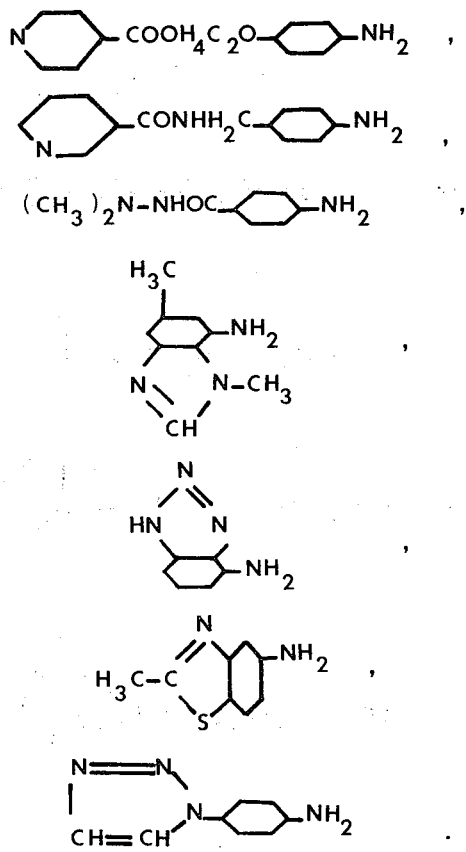

Dyestuffs having similar good properties are also obtained when the dyestuffs obtained as described in Example 2 and 3 and No. 32 to 55 in the Table, are quaternised with one of the quaternising agents indicated.

EXAMPLE 5

16.5 Parts of the compound of the formula

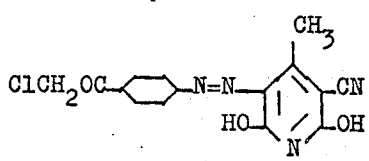

are stirred with 33 parts of 40% aqueous trimethylamine solution and 20 parts of water for 20 hours at about 20° to 25°C and the mixture is thereafter heated at 60° to 65°C for about 6 hours. The mixture is then cooled, 500 parts of water are added and then hydrochloric acid until a weakly acid reaction is obtained. The mixture is thereafter heated, filtered hot, and the filtrate mixed with sodium chloride. The precipitated dyestuff is filtered. It is identical with the dyestuff obtained according to Example 1.

When the dyestuffs indicated in column I of the Table below are condensed with the amines indicated in column II, dyestuffs are obtained which dye polyacrylonitrile fibres the shades indicated in column III.

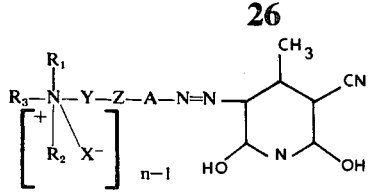

in which
A is unsubstituted or substituted phenylene, biphenylene or naphthylene which, when substituted, is substituted by one or more of halogen, alkyl, or alkoxy, or is mono-substituted by nitro, sulphonamide, phenyl, phenoxy, phenylazo, halogen alkyl, alkylsulphonyl, N-alkyl sulphonamide or carbalk-

| | I | II | III |
|---|---|---|---|
| 1 | [structure with CH$_3$, CN, N=N, HO, OH, COCH$_2$Br] | $N(C_2H_5)_3$ | yellow |
| 2 | ClCH$_2$CH$_2$HNO$_2$S-[structure with Cl, CH$_3$, CN, N=N, HO, OH] | [piperidine structure] | " |
| 3 | H$_3$C-[phenyl]-SO$_2$OH$_4$C$_2$O-[phenyl]-N=N-[structure with CH$_3$, CN, HO, OH] | [cyclic amine with CH$_2$CH$_2$ groups and CH-NH$_2$] | " |

Dyeing Instruction:

1 Part of dyestuff, 1 part of 50% neutralised reaction product of 1 mol of a higher alkylamine having about 20 carbon atoms and 30 mols of ethylene oxide, 1 part of concentrated acetic acid and 7 parts of water are ground in a ball mill to give a fine dispersion.

The dyestuff preparation so obtained is added to a dyebath of consisting 400 parts of water and 4 parts of a 50% solution of a condensation product of 1 mol of 1-methyl-2-heptadecylbenzimidazole with 7 mols of ethylene oxide which had been adjusted to a pH value of 4 with acetic acid. 100 Parts of well-wetted polyacrylonitrile flocks are introduced, the bath is heated to boiling during 30 minutes and dyeing is carried out for 1½ hours at the boiling point. The dyed material is subsequently well rinsed.

I claim:
1. A basic azo dyestuff of the formula oxy where in each case the alkyl radical contains at most 4 carbon atoms,

Z is a direct bond, —O—, —S—, —NR'—, —CO—, —OCO—, —NR'CO—, —NR'SO$_2$—, —SO$_2$—,

—COOC$_2$H$_4$—O—

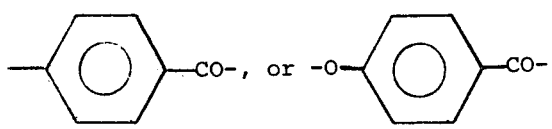

where
R' is hydrogen or lower alkyl,
Y is $C_1$–$C_6$ alkylene, $C_1$–$C_6$ alkylene interrupted by —S—, —O—, or —NH—, or with N, $R_1$ and $R_3$ or with N and $R_3$ forms benztriazolyl, benzimidazolyl, triazolyl or pyridyl,
$R_1$ and $R_2$ each is hydrogen, alkyl of 1 to 4 carbon atoms, phenyl, benzyl or cyclohexyl,
$R_3$ is hydrogen, alkyl of 1 to 4 carbon atoms, benzyl, cyclohexyl, alkoxy of 1 to 4 carbon atoms or amino,
or where one or more of $R_1$, $R_2$ and $R_3$ together with N forms pyridyl, piperidyl, quinolyl, morpholinyl, pyrrolidyl or cyclohexylamine,
$X^-$ is an anion and
n is 1 or 2.

2. A basic azo dyestuff, according to claim 1, wherein A represents phenylene or substituted phenylene, Y represents $C_1$–$C_6$ alkylene, and Z is —CO—.

3. A basic azo dyestuff according to claim 1 of the formula

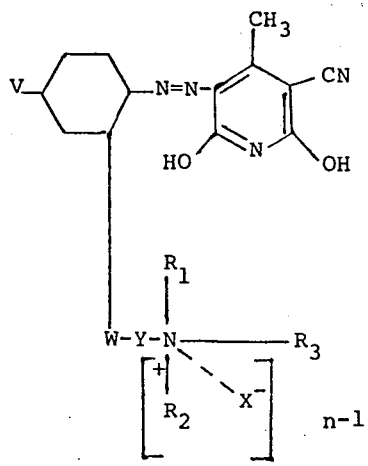

in which
V is nitro, alkylsulphonyl, sulphonamide or N-alkylsulphonamide, where, in each case, the alkyl radical contains at most 4 carbon atoms,
W is —O—, —S—, a direct bond,

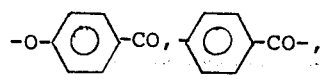

—$SO_2$—, —$SO_2NR_4$—, —COO—, or —NHCO— where $R_4$ is hydrogen or lower alkyl.

4. A basic azo dyestuff according to claim 1 in which Y is methylene or ethylene,
and $R_1$ and $R_2$ each is methyl, ethyl, phenyl or hydrogen.

5. A basic azo dyestuff according to claim 1 in which $R_1$, $R_2$ and $R_3$ is each methyl or ethyl or where one or more of $R_1$, $R_2$ and $R_3$ with N forms pyridyl, piperidyl, quinolyl, morpholinyl, pyrrolidyl or cyclohexylamine.

6. A basic azo dyestuff according to claim 1 in which X is $Cl^-$, $Br^-$, $I^-$, $SO_4^=$, alkyl—$SO_3$— where the alkyl group contains 1 to 7 carbon atoms, phenyl—$SO_3$— or $C_1$–$C_2$ alkyl—$SO_4$—.

7. A basic azo dyestuff as claimed in claim 1, wherein Z represents —O—, —S—, —NR'—, —CO—, —OCO—, —NR'CO— or —NR'$SO_2$—, wherein R' denotes hydrogen or lower alkyl.

8. Basic azo dyestuffs as claimed in claim 1 of the formula

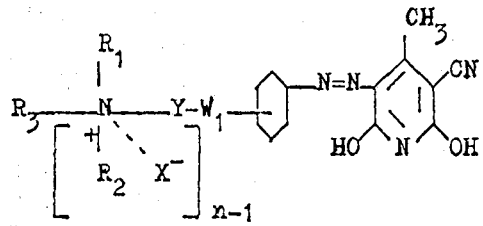

in which $W_1$ denotes a direct bond or a —$SO_2$—, —$SO_2NR_4$—, —$CONR_4$— or —COO— bridge and $R_1$, $R_2$, $R_3$, $R_4$, X, Y and n have the above mentioned significance.

9. The dyestuff of claim 1 of the formula

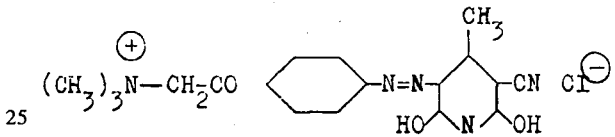

10. The dyestuff of claim 1 of the formula

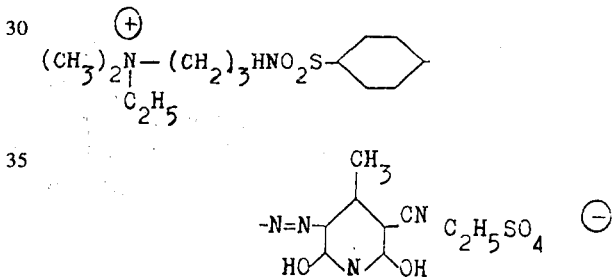

11. The dyestuff of claim 1 of the formula

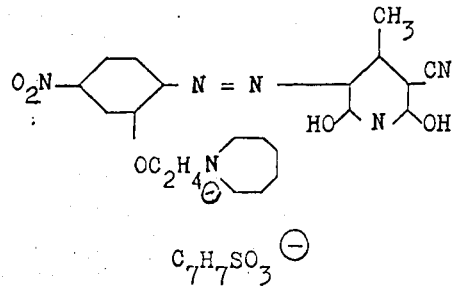

12. The dyestuff of claim 1 of the formula

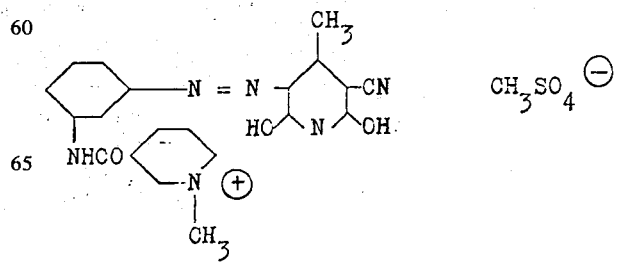

13. The dyestuff of claim 1 of the formula

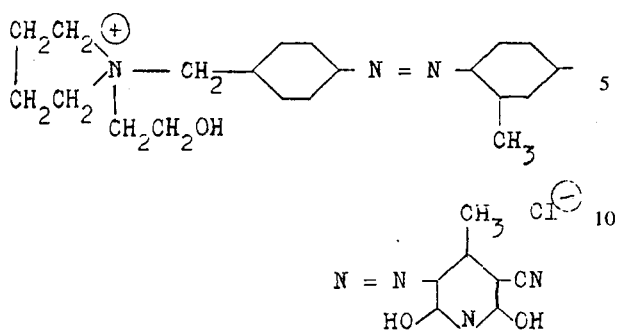

14. The dyestuff of claim 1 of the formula

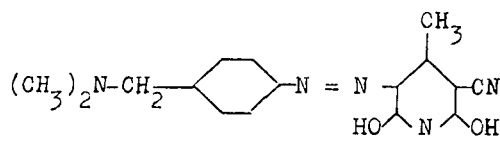

15. The dyestuff of claim 1 of the formula

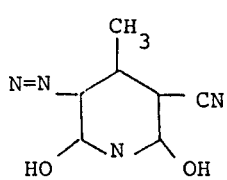

16. A basic azo dyestuff of the formula

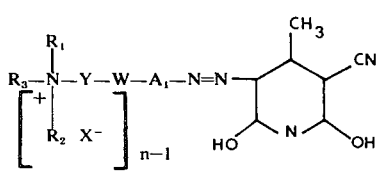

wherein $A_1$ is pyridyl, pyrazolyl, imidazolyl, triazolyl, tetrazolyl, oxazolyl, thiazolyl, selenazolyl, oxadiazolyl, thiadiazolyl, pyrimidyl, triazinyl, quinolinyl, indazolyl, benzimidazolyl, naphthimidazolyl, benzoxazolyl, naphthoxazolyl, benzthiazolyl, naphthothiazolyl or benzoselenazolyl, benzimidazolyl substituted by chloro, 3-methylpyrazolyl bound to the azo group in 5-position or thiazolyl, thiadiazolyl or benzthiazolyl substituted by lower alkyl and wherein W denotes a direct bond, —$SO_2$—NH—, —COO—, —NHCO—, —S—, —O—, or phenylene, Y is $C_1$–$C_6$ alkylene, $C_1$–$C_6$ alkylene interrupted by —S—, —O—, or —NH—, or with N, $R_1$ and $R_3$ or with N and $R_3$ forms benztriazolyl, benzimidazolyl, triazolyl or pyridyl, $R_1$ and $R_2$ each is hydrogen, alkyl of 1 to 4 carbon atoms, phenyl, benzyl or cyclohexyl, $R_3$ is hydrogen, alkyl of 1 to 4 carbon atoms, benzyl, cyclohexyl, alkoxy of 1 to 4 carbon atoms or amino or where one or more of $R_1$, $R_2$ and $R_3$ together with N forms pyridyl, piperidyl, quinolyl, morpholinyl, pyrrolidyl or cyclohexylamine, $X^-$ is an anion and $n$ is 1 or 2.

17. The dyestuff of claim 15 of the formula

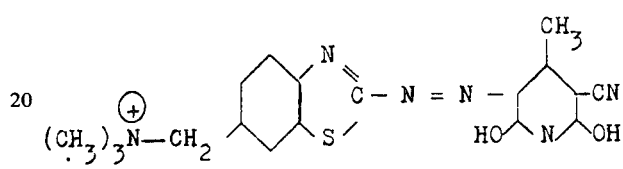

18. The dyestuff of claim 16 of the formula

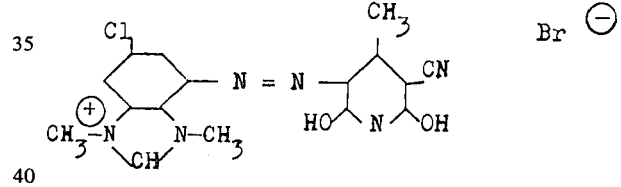

19. The dyestuff of claim 16 of the formula

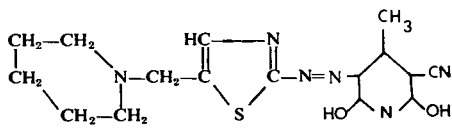

* * * * *

UNITED STATES PATENT AND TRADEMARK OFFICE
CERTIFICATE OF CORRECTION

PATENT NO. : 3,966,706
DATED : June 29, 1976
INVENTOR(S) : Visvanathan Ramanathan It is certified that error appears in the above–identified patent and that said Letters Patent are hereby corrected as shown below:

Col. 29, line 25, claim 15, should read

--

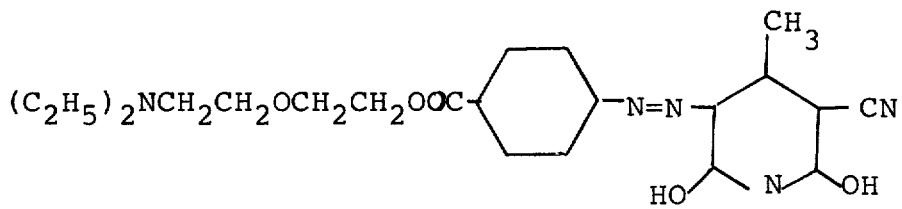

--

Signed and Sealed this

Twenty-first Day of September 1976

[SEAL]

*Attest:*

RUTH C. MASON
*Attesting Officer*

C. MARSHALL DANN
*Commissioner of Patents and Trademarks*